United States Patent [19]

Brienza et al.

[11] 4,150,285

[45] Apr. 17, 1979

[54] REMOTE OPTICAL DISPLAY DESIGNATOR

[75] Inventors: Michael J. Brienza, Westport, Conn.; Jason M. Gordon, Katonah, N.Y.

[73] Assignee: United Technologies Corporation, Hartford, Conn.

[21] Appl. No.: 864,956

[22] Filed: Dec. 27, 1977

[51] Int. Cl.[2] .......................... G01J 1/20; G01J 1/28; G01J 1/36

[52] U.S. Cl. .................................. 250/203; 358/107; 250/227

[58] Field of Search ................... 358/107 (U.S. only); 250/203, 227; 364/521

[56] References Cited

U.S. PATENT DOCUMENTS 3,441,722  4/1969  Gloess .......................... 250/578 X

FOREIGN PATENT DOCUMENTS 2335769  1/1974  Fed. Rep. of Germany .......... 364/521

*Primary Examiner*—Robert Segal
*Attorney, Agent, or Firm*—Richard P. Lange

[57] ABSTRACT

An optical designator system employs a remote source of electromagnetic energy, such as a small hand-held infrared LED or the like, to generate an identifying beam which is directed to the same faceplate through which a displayed image is viewed. A diffuser medium is disposed at the image plane along the rear surface of the faceplate and scatters the incident beam of electromagnetic energy toward orthogonal pairs of photodetectors located adjacent to the edges of the faceplate. The output signals from the photodetectors are presented to a normalizer circuit which compensates for intensity variations of the source of electromagnetic energy into the faceplate. Therefore, the output signal from each normalizer circuit varies in a relationship which is proportional to the distance between the photodetectors at which the incident beam strikes the diffuser medium. The remote energy source is preferably modulated with a waveform which is discernible both from background ambient light and that of the displayed image. Optical and electrical filters associated with the photodetectors insure that normalizer circuits respond only to electromagnetic energy from the remote source.

10 Claims, 4 Drawing Figures

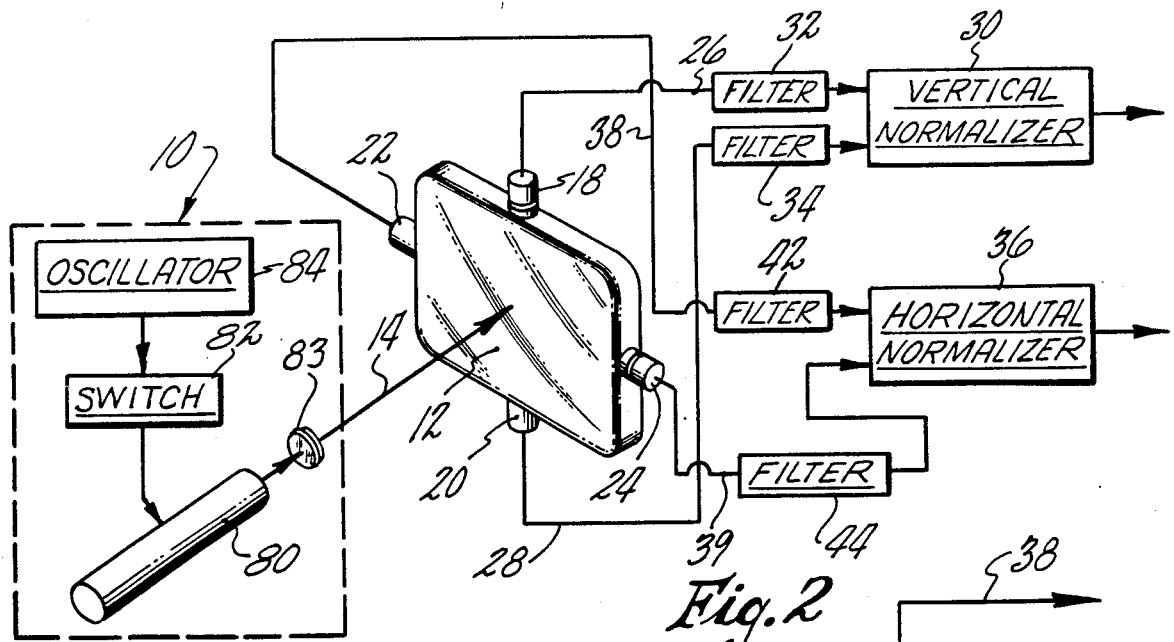
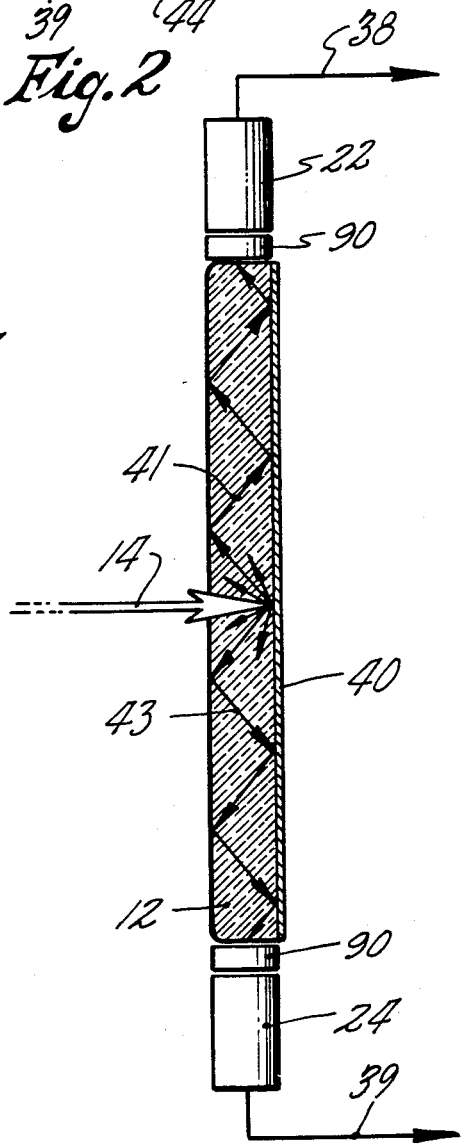
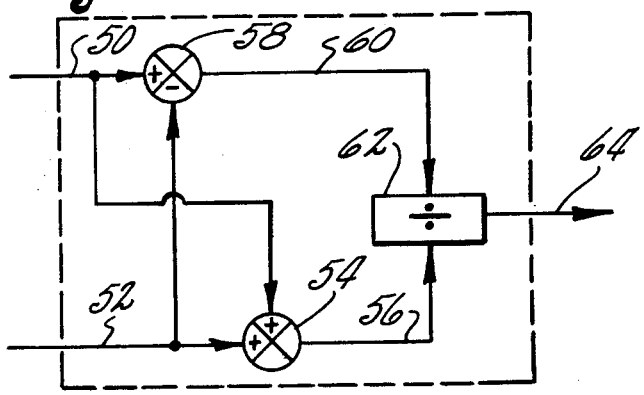
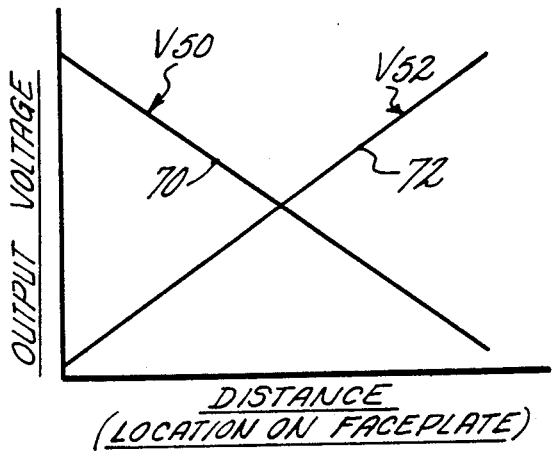

REMOTE OPTICAL DISPLAY DESIGNATOR

BACKGROUND OF THE INVENTION

1. Field of the Invention

This invention relates to a remote optical designator system and, more particularly, to a designator system employing a portable hand-held energy source which identifies specific points or areas of a display such as that on the faceplate of a conventional cathode ray tube, flat panel, or photographic display.

2. Description of the Prior Art

There are many situations where it is advantageous to identify a point or circumscribe an area on a displayed image from a location removed from the faceplate through which the image is viewed. In some known systems a "light pen" is used to identify certain points or areas on the faceplate of a CRT and this system may include apparatus providing an input to a computer which processes the information and then may readout the results on the same CRT. Often the computer provides an optical feedback to the user in the form of a cursor on the faceplate of the CRT which provides a visual indication of the point or points identified by the "light pen".

One such system is disclosed in U.S. Pat. No. 3,441,722, issued Apr. 29, 1969 to P. Gloess for SYSTEM OF COMMUNICATION BETWEEN MAN AND MACHINE. Two orthogonal pairs of photoresponsive elements are disposed around the perimeter of a cathode ray tube. The tip of the pen is grooved and pointed so that light emanating from the phosphor on the inside of the cathode ray tube can be scattered in a planar fashion toward the perimeter of the faceplate. The electrical signals, via the incident light on the photocells, are used to generate a cursor to designate the particular location of the light pen on the faceplate of the CRT.

A particular problem with this and other similar systems is that the "light pen" is a passive element and only reflects or detects local light generated by the display. This means that unless light is routinely generated across the entire display, such as by the scanning electron beam of a CRT, the computer cannot "see" or respond to all possible locations of the light pen. Since a displayed image normally comprises a series of light and dark areas, the light pen can only identify those points in the image which are light. This problem is even more apparent in "stroke-write" display system since the electromagnetic beam of the CRT is not routinely scanned in a predetermined manner as it is in a video display system. In a designator system used with a stroke-write display, it is normally necessary to initially move the light pen to a light spot, such as a cursor displayed in one corner, and pull the cursor to the area of interest in order to read information into the computer.

Another problem of the designator systems employing the passive type of "light pen" just described is that the light pen must be held in close proximity to the display image to reflect light toward the pickups around the perimeter of the display. In the situation where the displayed image is particularly large, i.e. where it is to be viewed by a number of people, a passive "light pen" becomes difficult to use. These systems expand the displayed image from a small source, such as a conventional CRT, by optical means and present it to the diffusing surface of a large display area where the enlarged image is viewed. Because of the small source and its physical separation from the viewing area, the passive type of "light pen" is not suitable for use with this type of system.

SUMMARY OF THE INVENTION

It is a primary object of the present invention to provide a remote designator system in which the electromagnetic energy scattered from a pointer is not dependent upon light from the displayed image.

According to the present invention, a remote designator system is disclosed which is suitable for identifying a location on an image plane at the rear of a faceplate. The faceplate could be the faceplate of a CRT and a phosphor coating disposed along the inner surface of the faceplate would then be situated at the image plane. Pairs of photoresponsive elements located adjacent the edges of the faceplate receive electromagnetic energy scattered in the faceplate from the incident beam striking the phosphor. A normalizer circuit utilizes conventional monopulse processing to compensate for the varying intensity of the incident beam as may result from a change in distance from the faceplate and generates an output signal proportional to the location of the incident beam between the edges of the faceplate.

According to another aspect of the invention, a system is provided to identify areas on a display screen by means which is both insensitive to light from a display image, if any, or ambient light. A conventional light emitting diode, or the like, has a modulated signal thereon and is directed to a faceplate on which a diffusing medium is situated. Optical and electrical filters associated with orthogonal pairs of photoresponsive elements pass only those waveforms which correspond to the modulated signal. Normalizer circuits compensate for changes in the intensity of the energy received at the faceplate and provide an output signal having a magnitude proportional to the distance between the photodetectors at which the incident beam strikes the diffusing medium.

According to the present invention, a designator system is provided with a remote source of electromagnetic energy and is wholly independent of any displayed image.

BRIEF DESCRIPTION OF THE DRAWING

FIG. 1 is a perspective view illustrating the major components of a remote designator system according to the present invention;

FIG. 2 is an enlarged view, in cross section, illustrating an incident beam of electromagnetic energy scattered along the display faceplate;

FIG. 3 is a schematic diagram of one embodiment of the normalizer circuit used with the present invention; and, FIG. 4 is a graph illustrating the electrical response of the output signals from one opposite pair of photodiodes as a function of the point on the faceplate struck by the incident beam.

DESCRIPTION OF THE ILLUSTRATED EMBODIMENT

Referring initially to FIG. 1, a designator system for identifying specific points or outlining an area on a surface which is simultaneously useable for either the display of visual information or as an input to an information processing system, or both. A remote source 10 of electromagnetic energy is independently operable so that it can be spaced from a faceplate 12 through which a displayed image from a conventional photographic or electro-optical source is viewed on the image plane at the rear of the faceplate. Some of the different types of known visual display devices which can be used with the designator system of the present invention will be described in greater detail hereinafter. The remote source 10 generates a beam of electromagnetic energy 14 which is capable of being directed to any desired point or location on the faceplate 12.

Two pairs of photoresponsive elements, such as photodiodes, 18, 20 and 22, 24, are positioned immediately adjacent the edges of the faceplate 12, preferably along orthogonal axes. An optical filter 90 is positioned between each photodiode and the edge of the faceplate 12. The photodiodes are responsive to the electromagnetic energy incident thereon and have electrical output signal whose magnitude varies in proportion to the received electromagnetic energy. The photodiodes 18 and 20 are connected, via lines 26 and 28, respectively, to the inputs of a normalizer circuit 30. Filters 32 and 34, the bandpass characteristic thereof to be described in greater detail hereinafter, are electrically connected in the line 26, and 28, respectively. In a similar manner, the photodiodes 22 and 24 are electrically coupled to the inputs of a horizontal normalizer 36 via line 38 and 39, respectively. Filters 42 and 44 are connected in lines 38 and 39, respectively, for filtering the signal presented to the inputs of the normalizer 36.

The output signal from the vertical normalizer 30 is a signal whose magnitude is directly proportional only to the vertical distance from the incident beam to the top or bottom edges of the faceplate 12. Similarly, the output signal from the horizontal normalizer 36 is a signal whose magnitude is directly proportional only to the horizontal distance from the incident beam to the left or right edges of the faceplate 12. The output signals from the vertical normalizer 30 and the horizontal normalizer 36 are independent and are most often coupled to suitable processing circuitry to record the orthogonal coordinates of the designator beam in a manner known to those of ordinary skill. If desired, such processing circuitry might also create a cursor which would identify the precise location of the designated location for the viewer.

Referring next to FIG. 2, there is seen an enlarged cross-sectional view of the faceplate 12 together with one pair of the photoresponsive elements, the photodiode 22 and the photodiode 24, disposed at opposite edges of the faceplate 12. As indicated herebefore, the faceplate 12 defines an area on which an image from one of the many known sources is displayed, and the surface 40, which is a diffusing medium, extends over the entire rear surface of the faceplate. The viewer or viewers would normally look at the displayed image from the front of the faceplate (from the left as illustrated) and the image to be displayed may be directed to the surface 40 from either the front or backside of the faceplate 12.

As is seen, the incident beam of electromagnetic energy strikes the front of the faceplate 12, and the largest portion thereof passes therethrough striking the image plane which coincides with the surface 40. The surface 40 diffuses or scatters the electromagnetic energy approximately uniformly in all directions. The electromagnetic energy directed along pathways 41 and 43 is alternately partially reflected from the front on the faceplate 12 and scattered by the surface 40 until it reaches the edges of the faceplate 12. As will be appreciated, the intensity of the beam of electromagnetic energy reaching either edge of the faceplate 12 via the paths 41 and 43 is proprotional to the respective pathlength since the energy in the beam is diminished by each reflection-scattering step. Finally, the scattered energy in the path 41 and 43 leaves the faceplate 12 and is incident upon the photoresponsive elements, the photodiodes 22 and 24, respectively, where its magnitude is changed to a proportionally varying electrical signal on the lines 38 and 40, respectively.

Referring now to FIG. 3, there is illustrated one embodiment of the normalizer circuits shown in FIG. 1, and this circuit is used in both the vertical and horizontal channels to compensate for the variations in intensity of the beam of electromagnetic energy incident on the faceplate 12. Intensity variations can result from a number of different causes, e.g. dirt accumulating on the optical elements, power supply fluctuations in the remove source, smoke or other airborne pollution between the remote source and the faceplate, and change in the distance from the remote source to the faceplate. The basic technique used in the present invention to compensate for source distance variation is called "monopulse processing" and is generally known to those of ordinary skill. As shown, the input signals from each opposite pair of photodiodes are presented to the normalizer circuit via lines 50 and 52 and are fed to a summing junction 54 providing a signal on line 56 equivalent to the sum thereof. The input signals are also presented to a subtracting junction 58 providing a signal on line 60 equivalent to the difference between input signals. The sum and difference signals are presented to separate inputs of an analog divider 62. The analog output divider 62 provides an output signal on line 64 which is defined by the equation:

$$(V_{50} - V_{52})/(V_{50} + V_{52})$$

Accordingly, the output signal on the line 64 has a magnitude which is proportional to the difference in the electromagnetic energy intensity received by each orthogonal pair of photoresponsive elements scaled by the composite sum of the received electromagnetic energy from both the photodetectors.

Referring additionally to FIG. 4, there is seen a graphic illustration of the voltage gradients, on the lines 50 and 52 from one opposite pair of photoresponsive elements plotted with respect to the point on the faceplate struck by the incident beam 14 for one particular distance of the remote source 10 from the faceplate 12. As shown, the gradient line 70 represents the variation of one input to the normalizer circuit while the gradient line 72 represents the variation on the other input to the normalizer circuit. Although in the depicted situation, the gradients are essentially linear it should be understood that in the normal condition such a gradient would most likely be somewhat nonlinear, but continuous. As will be appreciated by those of ordinary skill, for a different distance of the source 10 from the faceplate 12 the slope of the gradient lines 70 and 72 will change causing the excursion of magnitudes of the input signals to the normalizer for different faceplate locations to change. However, by combining the signals in the manner heretofore described, the magnitude of the output signal on the line 64 will be substantially identical for any intensity of by the incident beam 14.

Referring again to FIG. 1, as indicated herebefore a particular advantage of the designator system according to the present invention is that it employs a portable selfcontained source of electromagnetic energy which can be extremely small in size and light in weight. Accordingly, such a remote source could be mounted on the head gear of a viewer for use as the designator part of a "heads up" display system. Alternatively, the remote source could be a small hand-held battery powered unit utilized by one viewer to identify particular portions of an optically expanded photographic display which might be presented to the diffusing surface 40 from either side of the faceplate 12. According to the present invention, the remote source 10 comprises a generator 80 which creates a beam of electromagnetic energy in response to actuation by a switch 82 and presents it to a lens 83 for focusing. The wavelength of the electromagnetic emanating from the generator 80 is preferably outside the visible light range so that it does not interfere with, and can be distinguished from, the light energy of the display. Many well known inexpensive generators suitable for this purpose are available, such as an infrared light emitting diode or the like, and could be used with the present invention. An identifiable signal, such as from an oscillator 84, is preferably modulated on the output waveform from the generator 80. The frequency of the identifiable signal is selected to match the bandpass characteristics of the filters 32, 34, 42 and 44 which are connected in the inputs to the normalizer circuit so that the pickup system rejects any spurious signals from ambient light or the display itself. Each photoresponsive element includes a cooperating optical filter 90 (FIG. 2) whose transmissiveness is selected to pass primarily waveforms of the same frequency as that of the generator 80, thus further minimizing the likelihood of the pickup system responding to any spurious waveforms.

In operation, it is anticipated that the remote designator system may well be a part of a larger and more comprehensive system, such as the type disclosed in U.S. Pat. No. 3,441,722 described herebefore. In such a case the faceplate 12 could be the faceplate of a cathode ray tube which serves as a readin and readout device to the computer. A special CRT need not be utilized since the photoresponsive elements can be positioned adjacent the edge portion of a conventional CRT faceplate. To "write in" information into the computer, the viewer need not hold his pen in close proximity to the faceplate of the CRT as required by the U.S. Pat. No. 3,441,772 disclosure. If the CRT display is of the "stroke-write" type, there is normally no systematic scan of the phosphor since the electron beam is only deflected in response to a specific readout signal. Therefore, rather than pull an identifying cursor into a darkened area of the display, a cursor can be instantaneously generated at any specific location in the display by the actuation of the remote source 10.

While the faceplate 12 described herein has been indicated, at least in one embodiment, to be the faceplate of a CRT, it will be appreciated by those of ordinary skill that the faceplate 12 might also be the viewing portion of a number of other types of visual display devices. Such known display devices would include liquid crystal displays, LED displays, plasma displays, where the diffusing surface is one of the electrode structures, or even conventional photographic display. With the photographic type of display, the image could be projected to the image plane along the surface 40 from the front of the faceplate 12, as shown in FIG. 2, or projected from the rear of the faceplate 12, commonly called "reverse projection", and the designator system would still function as heretofore described. Of course, with any type of photographic display there is normally no provision for the electrical generation of a cursor, and so the remote source would preferably generate electromagnetic energy in the visable range which would then be directly visable by the viewer on the image plane.

The above embodiment is to be considered in all respects as merely illustrative and not restrictive. The scope of the invention is to be determined by the appended claims rather than by the foregoing description. It is intended that all changes in constructions which would come within the meaning and range of the equivalency of the claims are to be embraced therein.

Having thus described typical embodiments of our invention, that which we claim as new and desire to secure by Letters Patent of the United States is:

1. A remote designator apparatus for identifying locations on a display area, comprising:
   a faceplate means having a diffusing surface on one face thereof forming an image plane;
   a source means for directing a beam of electromagnetic energy to the diffusing surface of said faceplate means;
   photoresponsive means disposed at the perimeter of said faceplate for receiving electromagnetic energy scattered along said faceplate by said diffusing surface; and
   means coupled to said photoresponsive means for providing an output signal indicating the location on said diffusing surface impinged by the incident beam of electromagnetic energy from said source means.

2. A designator apparatus according to claim 1, wherein said photoresponsive means includes two pair of photodiodes, said photodiodes of each pair positioned adjacent opposite edge portions of said faceplate means, and further including a normalizer circuit coupled to each pair of photodiodes for indicating the respective orthogonal distance along the faceplate impinged by said incident beam of electromagnetic energy.

3. A remote designator according to claim 2, wherein said normalizer circuit comprises a summing node, a subtracting node, and an analog divider having a pair of inputs, and wherein said photodiodes are electrically coupled to said summing node and said subtracting node, and wherein said summing supplies an electrical signal to one input of said analog divider proportional to the sum of the signals supplied by the photodiodes, and wherein the subtracting node supplied a signal to the other input of said analog divider whose magnitude is proportional to the location of the point impinged by the incident beam of electromagnetic energy from said source means.

4. A designator apparatus according to claim 1, wherein said source means includes a generator for creating a beam of electromagnetic energy having a wavelength outside the visible frequency spectrum, and wherein said source means further includes a selectively actuable oscillator means for modulating an identifiable signal onto the beam of electromagnetic energy generated by said generator means, and filter means turned to the frequency of said identifying signal.

5. A designator apparatus according to claim 1, wherein said faceplate means is a part of a cathode ray tube or the like, and wherein said diffusing surface is the phosphor coating on the inside face of said CRT, and wherein said photoresponsive means is a pair of photodiodes disposed adjacent to the opposite edge portions of the faceplate of said cathode ray tube.

6. A designator apparatus according to claim 4, further including an optical filter means disposed between each of said photoresponsive elements and said faceplate means, said optical filter passing electromagnetic energy of the same wavelength as that generated by said source means.

7. A designator apparatus according to claim 1, wherein said faceplate means is a part of a liquid crystal display device.

8. A designator apparatus according to claim 1, wherein said faceplate means is a part of a plasma display panel.

9. A designator apparatus according to claim 1, wherein said faceplate means is a part of a light emitting diode display.

10. A designator apparatus according to claim 1, wherein said faceplate means is a part of a photographic display, and wherein an image can be projected from either side of said faceplate means to form an image on said diffusing surface.

* * * * *

UNITED STATES PATENT AND TRADEMARK OFFICE
CERTIFICATE OF CORRECTION

PATENT NO. : 4,150,285
DATED : April 17, 1979
INVENTOR(S) : Michael J. Brienza & Jason M. Gordon It is certified that error appears in the above-identified patent and that said Letters Patent are hereby corrected as shown below:

Column 2, line 28, change "display" to --displayed--.

Column 3, line 1, after "spaced" insert "apart".

Column 4, lines 18 and 19, change "remove" to --remote--.

Column 5, line 48, change "3,441,772" to --3,441,722--.

Signed and Sealed this

Twenty-first Day of August 1979

[SEAL]

Attest:

Attesting Officer

LUTRELLE F. PARKER
Acting Commissioner of Patents and Trademarks